US012512309B2

(12) United States Patent
Sugiyama et al.

(10) Patent No.: US 12,512,309 B2
(45) Date of Patent: Dec. 30, 2025

(54) MASS SPECTROMETER AND METHOD FOR CONTROLLING SAME

(71) Applicant: HITACHI HIGH-TECH CORPORATION, Tokyo (JP)

(72) Inventors: Masuyuki Sugiyama, Tokyo (JP); Hideki Hasegawa, Tokyo (JP); Yuka Sugawara, Tokyo (JP); Riku Tamura, Tokyo (JP); Hiroyuki Yasuda, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 315 days.

(21) Appl. No.: 18/551,211

(22) PCT Filed: Mar. 22, 2022

(86) PCT No.: PCT/JP2022/013208
§ 371 (c)(1),
(2) Date: Sep. 19, 2023

(87) PCT Pub. No.: WO2022/215509
PCT Pub. Date: Oct. 13, 2022

(65) Prior Publication Data
US 2024/0177983 A1 May 30, 2024

(30) Foreign Application Priority Data
Apr. 5, 2021 (JP) ................................ 2021-063890

(51) Int. Cl.
*H01J 49/04* (2006.01)
*H01J 49/24* (2006.01)

(52) U.S. Cl.
CPC .......... *H01J 49/0422* (2013.01); *H01J 49/24* (2013.01)

(58) Field of Classification Search
CPC ...... H01J 49/24; H01J 49/045; H01J 49/0422; H01J 49/165; H01J 49/0468; H01J 49/167; H01J 49/10
See application file for complete search history.

(56) References Cited

U.S. PATENT DOCUMENTS 8,952,326 B1 2/2015 Ugarov
2003/0086826 A1 5/2003 Nishina et al.
(Continued)

FOREIGN PATENT DOCUMENTS

JP 2000-283971 A 10/2000
JP 2013-061324 A 4/2013
(Continued)

OTHER PUBLICATIONS

Office Action, mailed Oct. 15, 2024, for Japanese Application No. 2021-063890 (without English translation).
(Continued)

*Primary Examiner* — David E Smith
*Assistant Examiner* — Hsien C Tsai
(74) *Attorney, Agent, or Firm* — Baker Botts L.L.P.

(57) ABSTRACT

Provided are a mass spectrometer and a method for controlling the same capable of suppressing decrease in sensitivity even where the atmospheric pressure around the mass spectrometer varies. The mass spectrometer includes an ion source, a mass analysis unit, a control unit, and a storage unit. The ion source includes an ion source chamber, an inlet, a first gas introduction port, a second gas introduction port, an outlet, and a gas discharge port. The storage unit stores a table indicating a relationship between a measurement condition and a flow rate of the second gas. The control unit changes the flow rate of the second gas according to the measurement condition on the basis of the table, and con-
(Continued)

trols a flow rate of the first gas to suppress a variation in a pressure inside the ion source chamber.

8 Claims, 8 Drawing Sheets

(56) References Cited

U.S. PATENT DOCUMENTS

| | | | | |
|---|---|---|---|---|
| 2009/0194687 | A1* | 8/2009 | Jolliffe .................... | H01J 49/10 250/288 |
| 2013/0062515 | A1 | 3/2013 | Quimby et al. | |
| 2015/0083930 | A1* | 3/2015 | Matsubara .............. | H01J 37/08 250/423 F |
| 2015/0102232 | A1 | 4/2015 | Satake et al. | |
| 2016/0300703 | A1 | 10/2016 | Hasegawa et al. | |
| 2022/0128529 | A1 | 4/2022 | Kageyama et al. | |

FOREIGN PATENT DOCUMENTS

| | | | |
|---|---|---|---|
| JP | 2015-201449 | A | 11/2015 |
| WO | WO 2014/084015 | A1 | 6/2014 |
| WO | WO 2020/166060 | A1 | 8/2020 |

OTHER PUBLICATIONS

Extended European Search Report, mailed Mar. 12, 2025, for European Application No. 22784494.1.

International Search Report, mailed Jun. 14, 2022, for International Application No. PCT/JP2022/013208.

Written Opinion, mailed Jun. 14, 2022, for International Application No. PCT/JP2022/013208 (without English translation).

* cited by examiner

*FIG. 8*

$$p_1 = \frac{Q_1 + Q_2 + C_1 p_0 + C_2 p'_0}{C_1 + C_2}$$ ··· FORMULA 1

$$p_1 = \frac{1}{C_1}(Q_1 + Q_2) + p_0$$ ··· FORMULA 2

$$q'_n = S_n p'_n - q'_{n+1}$$ ··· FORMULA 3

$$q'_n = S_n p'_n$$ ··· FORMULA 4

$$q'_{n+1} = C'_{n+1}(p'_n - p'_{n+1})$$ ··· FORMULA 5

MASS SPECTROMETER AND METHOD FOR CONTROLLING SAME

TECHNICAL FIELD

The present invention relates to a mass spectrometer and a method for controlling the same.

BACKGROUND ART

A mass spectrometer can separate ions according to a mass-to-charge ratio (m/z) of molecular ions in a vacuum, and can separate and detect ions with high sensitivity and high accuracy. In mass spectrometry, ions are separated for each mass-to-charge ratio (m/z). A mass spectrometer is generally used as a detector for liquid chromatography (LC), and an analysis method called liquid chromatography mass spectrometry (LC/MS) is often used.

As an ionization method of a mass spectrometer, an electrospray ionization method or an atmospheric pressure chemical ionization method for generating ions under atmospheric pressure is widely used. In these ionization methods, since the pressure in an ion source is substantially atmospheric pressure, the sensitivity of a mass spectrometer may vary due to the influence of the atmospheric pressure around the mass spectrometer or the like.

PTL 1 discloses a method of, with respect to an airtight ion source, controlling a pressure in the ion source by adjusting a flow rate of a nebulizer gas or a heating gas introduced into the ion source.

CITATION LIST

Patent Literature

PTL 1: U.S. Pat. No. 8,952,326

SUMMARY OF INVENTION

Technical Problem

PTL 1 discloses a method of controlling a pressure in the ion source by adjusting a flow rate of a gas used for ionization of a sample, such as a nebulizer gas, a heating gas, or a counter gas introduced into the airtight ion source.

However, a flow rate of a gas used for ionization has a unique optimum value depending on a sample to be measured, a composition of a sample solution, and a flow rate of a sample solution. Thus, when a gas flow rate is adjusted in order to cancel out a variation in a pressure inside an ion source, there is a problem that a gas flow rate deviates from the optimum value and the sensitivity of a mass spectrometer decreases.

The present invention has been made to solve such a problem, and an object of the present invention is to provide a mass spectrometer and a method for the same capable of suppressing decrease in sensitivity even when the atmospheric pressure around the mass spectrometer varies.

Solution to Problem

An example of a mass spectrometer according to the present invention includes:

- an ion source that ionizes a sample; a mass spectrometry unit that detects ions for each mass-to-charge ratio; a control unit that controls a flow rate of a gas; and a storage unit, in which
- the ion source includes
  - an ion source chamber,
- an inlet through which the sample is introduced into the ion source chamber,
  - a first gas introduction port through which a first gas is introduced into the ion source chamber,
  - a second gas introduction port through which a second gas for ionizing the sample is introduced into the ion source chamber,
  - an outlet through which ions are discharged from the ion source chamber to the mass spectrometry unit, and
  - a gas discharge port through which a gas is discharged from the ion source chamber,
- the storage unit stores a table indicating a relationship between a measurement condition and a flow rate of the second gas, and
- the control unit
  - changes the flow rate of the second gas according to the measurement condition on the basis of the table, and
  - controls a flow rate of the first gas to suppress a variation in a pressure inside the ion source chamber.

Further, an example of a method for controlling a mass spectrometer according to the present invention includes

- changing a flow rate of a second gas for ionizing a sample according to a measurement condition on the basis of a table indicating a relationship between the measurement condition and the flow rate of the second gas; and
- controlling a flow rate of a first gas to suppress a variation in a pressure inside an ion source chamber.

The present specification includes the disclosure of Japanese Patent Application No. 2021-063890 on which priority of the present application is based.

Advantageous Effects of Invention

According to the mass spectrometer and the method for controlling the same related to the present invention, it is possible to suppress decrease in sensitivity even when the atmospheric pressure around the mass spectrometer varies.

BRIEF DESCRIPTION OF DRAWINGS

FIG. 8 illustrates mathematical formulae used in First Embodiment to Fourth Embodiment.

DESCRIPTION OF EMBODIMENTS

Hereinafter, embodiments of the present invention will be described with reference to the accompanying drawings.

First Embodiment

Figure 1:
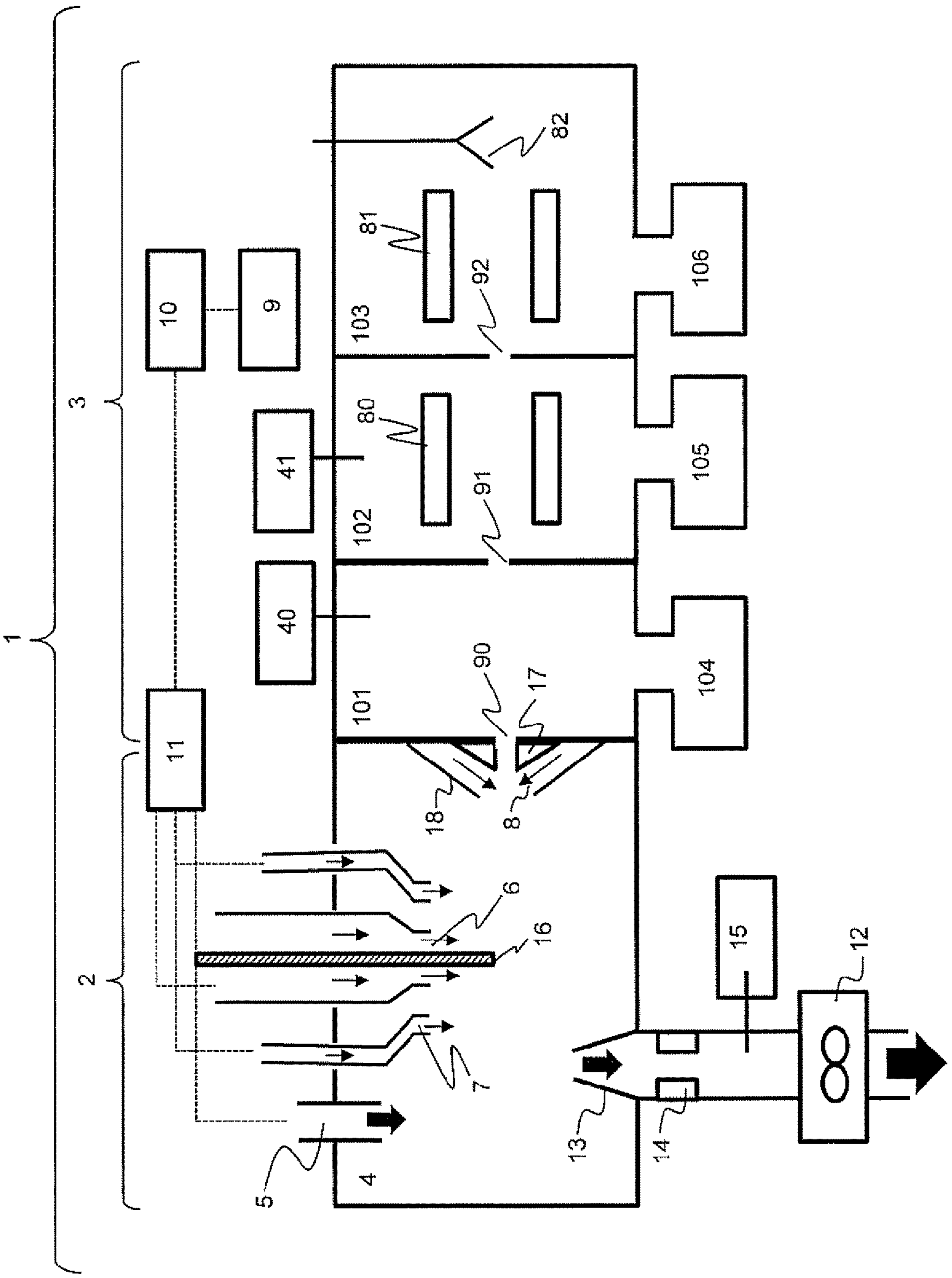
FIG. 1 is a configuration diagram of a mass spectrometer of First Embodiment.

FIG. 1 illustrates a configuration of a mass spectrometer 1 according to First Embodiment. The mass spectrometer 1 executes a control method described in the present specification. The mass spectrometer 1 includes an ion source 2 and a vacuum chamber 3. The ion source 2 includes an ion source chamber 4 and ionizes a sample. The vacuum chamber 3 includes a mass spectrometry unit 81 therein, and the mass spectrometry unit 81 detects ions for each mass-to-charge ratio.

Ions generated by the ion source 2 are introduced into the vacuum chamber 3 from a pore 90 of an introduction electrode 17 and analyzed by the mass spectrometry unit 81. A variable voltage is applied to the mass spectrometry unit 81 by a power supply 9. A timing of voltage application by the power supply 9 and a voltage value are controlled by a control unit 10.

The vacuum chamber 3 includes one or more vacuum chambers. In the example in FIG. 1, a plurality of stages of vacuum chambers 101, 102, and 103 are provided, and the vacuum chambers communicate with each other through pores 91 and 92. Vacuum pumps 104, 105, and 106 are respectively provided in the vacuum chambers 101, 102, and 103, and each vacuum chamber is exhausted by one vacuum pump. In the present embodiment, the vacuum chambers 101, 102, and 103 are respectively maintained at about 100 to 1000 Pa, about 1 to 10 Pa, and 0.1 Pa or less.

The vacuum chamber may be provided with an ion transport unit 80 that transmits ions therethrough while converging the ions. A multipole electrode, an electrostatic lens, or the like may be used for the ion transport unit 80.

The mass spectrometry unit 81 includes a detector 82 in addition to the mass spectrometry unit 81 described above. The mass spectrometry unit 81 performs ion separation or dissociation. As the mass spectrometry unit 81, an ion trap, a quadrupole filter electrode, a collision cell, a time-of-flight mass spectrometer, or a combination thereof may be used.

Ions that have passed through the mass spectrometry unit 81 are detected by the detector 82. For example, an electron multiplier tube may be used as the detector 82. The ions detected by the detector 82 are converted into electrical signals.

The mass spectrometer 1 includes a control unit 10. The control unit 10 analyzes a mass-to-charge ratio and an intensity of ions. The control unit 10 may be configured by using a computer including a calculation unit and a storage unit. The control unit 10 includes, for example, an input/output unit and a memory, and the memory stores software necessary for controlling the power supply 9. As a voltage supplied from the power supply 9 to the mass spectrometry unit 81, a high-frequency voltage, a direct-current voltage, an alternating-current voltage, or combination thereof may be used.

A configuration example of the ion source 2 will be described. In the ion source 2, a sample solution is introduced into a tubular capillary 16, and ions or droplets of the sample are sprayed from the downstream end of the capillary 16. Generated ions are moved in the direction of the introduction electrode 17 by an electric field between the capillary 16 and the introduction electrode 17, and are introduced into the vacuum chamber 3 from the pore 90 of the introduction electrode 17.

The ion source chamber 4 includes the following constituents.

The capillary 16 (inlet) for introducing a sample into the ion source chamber 4.

A pressure adjustment gas introduction port 5 (first gas introduction port) through which a pressure adjustment gas (first gas) is introduced into the ion source chamber 4.

A second gas introduction port for introducing a gas (second gas) for ionizing a sample into the ion source chamber 4. In the present embodiment, the second gas includes a nebulizer gas, a heating gas, and a counter gas, and the second gas introduction port includes a nebulizer gas introduction port 6, a heating gas introduction port 7, and a counter gas introduction port 8.

The pore 90 (outlet) through which ions are discharged from the ion source chamber 4 to the mass spectrometry unit 81.

An exhaust port 13 (gas discharge port) for discharging a gas from the ion source chamber 4.

The ion source chamber 4 is in an airtight state or a nearly airtight state, and has a configuration in which a gas does not enter and exit from other than the above-described openings. As a result, it is possible to prevent droplets of a sample solution, components obtained by vaporizing the droplets, and the like from leaking out of the ion source 2, and it is possible to prevent foreign matter around the mass spectrometer 1 from flowing into the ion source 2 and affecting ionization.

The exhaust port 13 is included in an exhaust line. The exhaust port 13 may be connected to an exhaust duct or the like of a facility in which the mass spectrometer 1 is installed. The exhaust port 13 may include a flow path resistor 14.

Figure 2:
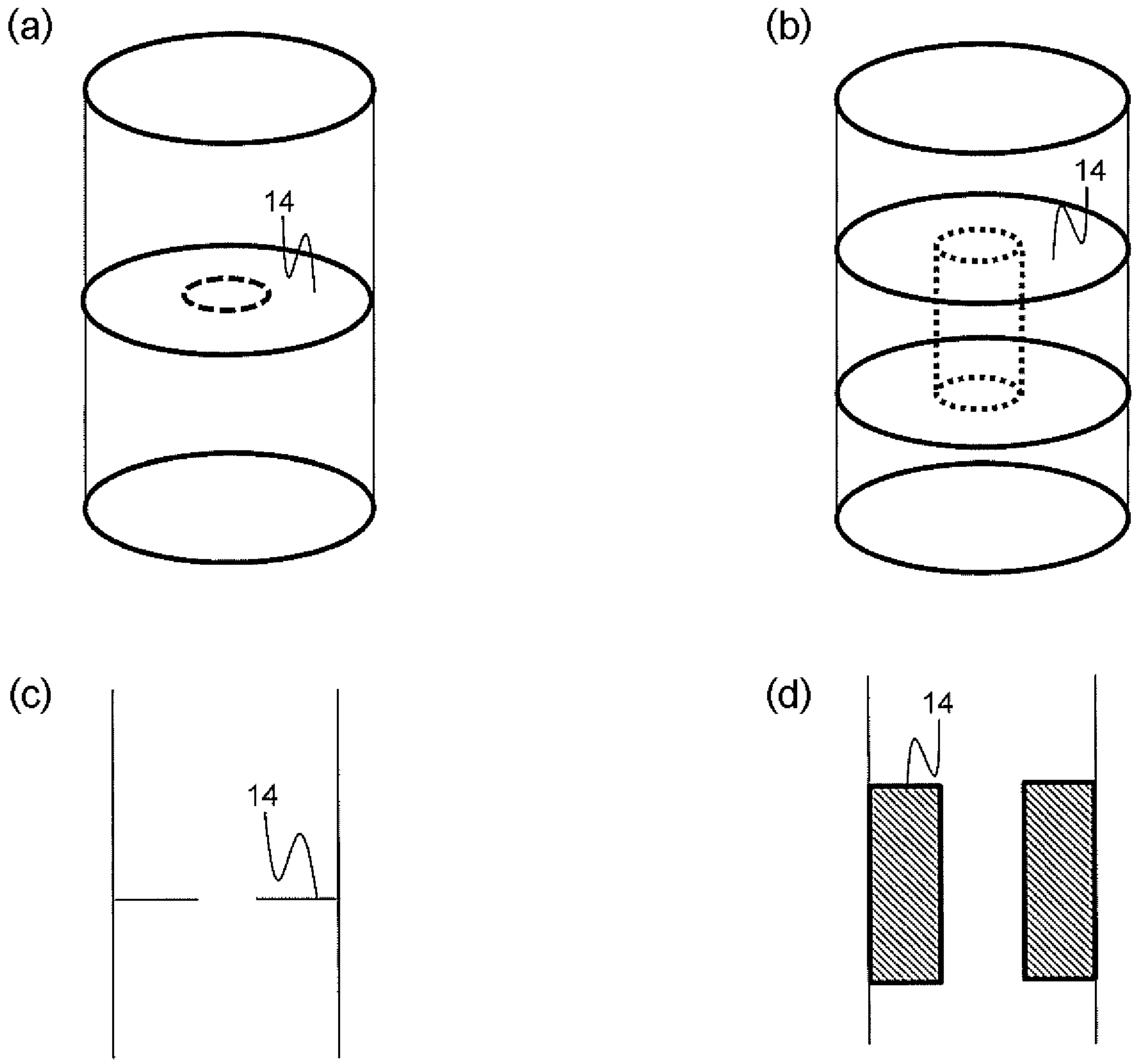
FIG. 2 is a configuration diagram of a flow path resistor of First Embodiment.

FIG. 2 illustrates an example of a schematic diagram of the flow path resistor 14. FIG. 2(*a*) is a perspective view of a first example, FIG. 2(*c*) is an end view by a cross section including an axis of the first example, FIG. 2(*b*) is a perspective view of a second example, and FIG. 2(*d*) is an end view according to a cross section including an axis of the second example.

In the example in FIGS. 2(*a*) and (*c*), the flow path resistor 14 includes a perforated plate. In the example in FIGS. 2(*b*) and (*d*), the flow path resistor 14 includes a flow path thinner than flow paths before and after it. The flow path resistor 14 is not necessarily an independent component, and may be configured as a part of a form of the exhaust port 13, for example.

A conductance of the flow path resistor 14 is smaller than that of other portions of the exhaust line (for example, before and after the flow path resistor 14). There is a pressure difference between the downstream of the flow path resistor 14 and the upstream of the flow path resistor 14 (that is, inside the ion source chamber 4). The pressure difference changes according to a conductance of the flow path resistor 14 and a flow rate of a gas flowing through the flow path resistor 14.

The presence of this pressure difference facilitates control of the pressure inside the ion source chamber 4. For example, when the conductance of the flow path resistor 14 becomes smaller, the pressure inside the ion source can be greatly changed with a small change in flow rate, so that the pressure inside the ion source can be easily adjusted. On the other hand, when the conductance of the flow path resistor 14 is too small, an undesirable airflow (for example, backflow) occurs inside the ion source, which causes carryover and the like.

The mass spectrometer 1 includes a pressure gauge 15. The pressure gauge 15 is disposed downstream of the flow path resistor 14. The pressure gauge 15 measures the pressure (back pressure) in the exhaust line on the downstream side of the flow path resistor 14.

In the exhaust line, an exhaust mechanism 12 such as a fan or a pump may be provided on the downstream side of the location where the pressure gauge 15 is installed. By providing the exhaust mechanism 12, a pressure difference can be formed between the upstream side and the downstream side of the exhaust mechanism 12.

A voltage of 1 to 10 kV is applied to the capillary 16 when positive ions are generated, and a voltage of −1 to −10 kV is applied to the capillary 16 when negative ions are generated. A flow rate of a sample solution is set within a range of about 1 nL/min to 10 mL/min.

A substantially cylindrical nebulizer gas spray pipe used to spray the nebulizer gas is disposed around the capillary 16. A flow path of the nebulizer gas is formed between the capillary 16 and the nebulizer gas spray pipe, and a downstream end thereof is the above-described nebulizer gas introduction port 6. The nebulizer gas is sprayed from the nebulizer gas introduction port 6. A flow rate of the nebulizer gas is about 0.5 L/min to 10 L/min.

By using the nebulizer gas, droplets sprayed from the downstream end of the capillary 16 can be refined to promote vaporization, and ionization efficiency can be improved.

In order to efficiently refine the droplets, it is necessary to set a flow rate of the nebulizer gas to be high such that a speed at the time of ejecting the nebulizer gas is sufficiently high. On the other hand, when the flow rate of the nebulizer gas is too high, sample ions are diluted by the nebulizer gas, and the density decreases, so that the sensitivity of mass spectrometry decreases.

The optimum flow rate of the nebulizer gas depends on conditions related to measurement (hereinafter referred to as "measurement conditions"). The measurement conditions include, for example, a composition of a sample solution and a flow rate of the sample solution. Specific examples may include ease of vaporization of the sample solution, ease of thermal decomposition of the sample, size of ions, and the like. The measurement conditions are not limited to a sample itself, and may include conditions related to a measurement operation and conditions unique to the mass spectrometer 1.

The ionization of the sample can be promoted by heating a space where ions and droplets are sprayed from the downstream end of the capillary 16 with the heating gas (for example, about 800° C. at maximum). A double tube (for example, a double cylinder) for spraying the heating gas is provided outside the nebulizer gas spray pipe. A space between the inner tube and the outer tube of the double tube serves as a flow path of the heating gas, and a downstream end thereof serves as the above-described heating gas introduction port 7. A flow rate of the heating gas is about 0.5 L/min to 50 L/min.

The higher the temperature or the flow rate of the heating gas, the higher the effect of promoting ionization by vaporizing a solvent from charged droplets. In a case where a sample solution has a solvent composition at which vaporization of the sample solution becomes more difficult, an optimum flow rate or an optimum temperature of the heating gas becomes higher. On the other hand, when a temperature or a flow rate of the heating gas is high, the sensitivity of mass spectrometry for a sample which is likely to be thermally decomposed decreases. Therefore, the optimum flow rate of the heating gas depends on the measurement conditions.

A counter electrode 18 is provided to face the introduction electrode 17. The counter electrode 18 has, for example, an opening and provided to cover the introduction electrode 17 and the pore 90, and a counter gas can flow between the introduction electrode 17 and the counter electrode 18.

By spraying the counter gas between the introduction electrode 17 and the counter electrode 18, it is possible to prevent neutral droplets and the like from entering holes of the introduction electrode 17. A flow rate of the counter gas is about 0.5 L/min to 10 L/min, and a diameter of the hole (opening) of the counter electrode 18 is 1 mm or more. For example, a voltage of about +1 to 10 kV is applied to the counter electrode 18.

When the flow rate of the counter gas is high, particularly for ions having a large size, the ions are swept away by the counter gas and are not taken into the vacuum chamber, so that the loss of ions increases. On the other hand, when the flow rate of the counter gas is low, neutral molecules such as droplets enter the vacuum chamber, and contamination of the electrode occurs. Therefore, the optimum flow rate of the counter gas depends on the measurement conditions.

The mass spectrometer 1 includes a flow controller 11 as a flow rate control mechanism that controls a flow rate of a gas. The flow controller 11 controls a flow rate of a gas (in the present embodiment, a nebulizer gas, a heating gas, and a counter gas) used for ionization according to an instruction of the control unit 10. The gas used for ionization is, for example, an inert gas such as nitrogen or argon.

The optimum flow rate of the gas used for ionization of the sample, such as the nebulizer gas, the heating gas, and the counter gas, depends on the measurement conditions. Therefore, in order to perform measurement with high sensitivity, it is necessary to change the flow rate of the gas used for ionization for each condition.

Before starting the measurement, the optimum flow rate of the gas used for ionization under each condition may be determined by performing preliminary evaluation and stored in the storage unit of the control unit 10 in a table form in advance. For example, the storage unit stores a table indicating a relationship between the measurement condition and the flow rate of the gas used for ionization.

Similarly, a pressure (target pressure) inside the ion source chamber 4 under each condition may be determined by performing preliminary evaluation and stored in the storage unit of the control unit 10 in a table form in advance. For example, the storage unit stores a table indicating a relationship between the measurement condition and the target pressure.

At the time of measurement, the control unit 10 controls the flow controller 11 on the basis of this table, so that the flow rate of the gas used for ionization can be changed according to the measurement conditions. As described above, the control unit 10 can determine the optimum flow rate according to the measurement conditions, and can control the flow rate of the gas used for ionization to be the optimum flow rate.

In this case, since the flow rate of the gas used for ionization can be set to an optimum value for various conditions, highly sensitive measurement can be performed. In the present embodiment, in order to control the pressure inside the ion source chamber 4 to be a predetermined target pressure, it is preferable to store the pressure inside the ion source chamber 4 when the optimum flow rate is determined in the control unit 10.

A pressure $p_1$ inside the airtight ion source chamber 4 is given by Formula 1 or Formula 2 in FIG. 8. In Formulas 1 and 2, $Q_1$ is a total flow rate of the gas used for ionization, $Q_2$ is a flow rate of the pressure adjustment gas, $C_1$ is a conductance of the flow path resistor 14 of the exhaust line, $C_2$ is a conductance of the pore 90 of the introduction electrode 17, $p_0$ is a pressure (that is, a back pressure) downstream of the flow path resistor 14 of the exhaust line, and $p'_0$ is a pressure of the vacuum chamber (the vacuum chamber 101 in the example in FIG. 1) downstream of the introduction electrode 17. In general, since $p'_0 \ll p_0$ and $C_1 \gg C_2$, Formula 1 can be approximated by Formula 2.

The pressure inside the ion source chamber 4 affects an optimum voltage value and a settable voltage range for each part of the mass spectrometer 1. For example, regarding a voltage applied to the capillary 16 of the ion source 2, when the pressure inside the ion source chamber 4 decreases, discharge is likely to occur, and an upper limit of the voltage that can be applied decreases. Thus, when the voltage of the capillary 16 is low, the sensitivity decreases in a case of a sample that is hardly ionized.

In the ion transport unit 80, kinetic energy of ions is reduced and converged due to collision with neutral gas molecules flowing in from the ion source 2. Thus, the optimum value of the electrode voltage is shifted depending on the pressure of the ion source 2, which causes the sensitivity to vary.

The conventional control method corresponds to a case where the flow rate ($Q_2$) of the pressure adjustment gas is set to zero in Formula 2. In this case, since the back pressure ($p_0$) is a value that varies depending on the air pressure around the mass spectrometer or the like, and the conductance ($C_1$) of the flow path resistor 14 is a fixed value determined by the device configuration, a controllable parameter for adjusting the pressure inside the ion source was only the total flow rate ($Q_1$) of the gas used for ionization.

However, a flow rate of the gas used for ionization needs to be set to an optimum value according to measurement conditions in order to perform measurement with high sensitivity. Thus, in the conventional control method, when the total flow rate ($Q_1$) of the gas used for ionization is adjusted in order to cancel out the variation in the pressure inside the ion source, there is a problem that a gas flow rate deviates from the optimum value, and the sensitivity of the mass spectrometer decreases.

In the present embodiment, a pressure adjustment gas is introduced from an introduction port (pressure adjustment gas introduction port 5) different from that for the gas used for ionization. A flow rate of the pressure adjustment gas may be, for example, about 0.5 L/min to 100 L/min. The pressure adjustment gas is, for example, a gas that does not directly influence ionization (excluding the influence depending on pressure). As the pressure adjustment gas, for example, a gas that is not a gas for ionizing a sample (or a gas that does not ionize a sample) may be used. A specific component may be an inert gas such as nitrogen or argon, or may be dry air. A flow rate of the pressure adjustment gas can be controlled by the control unit 10 and the flow controller 11.

Figure 3:
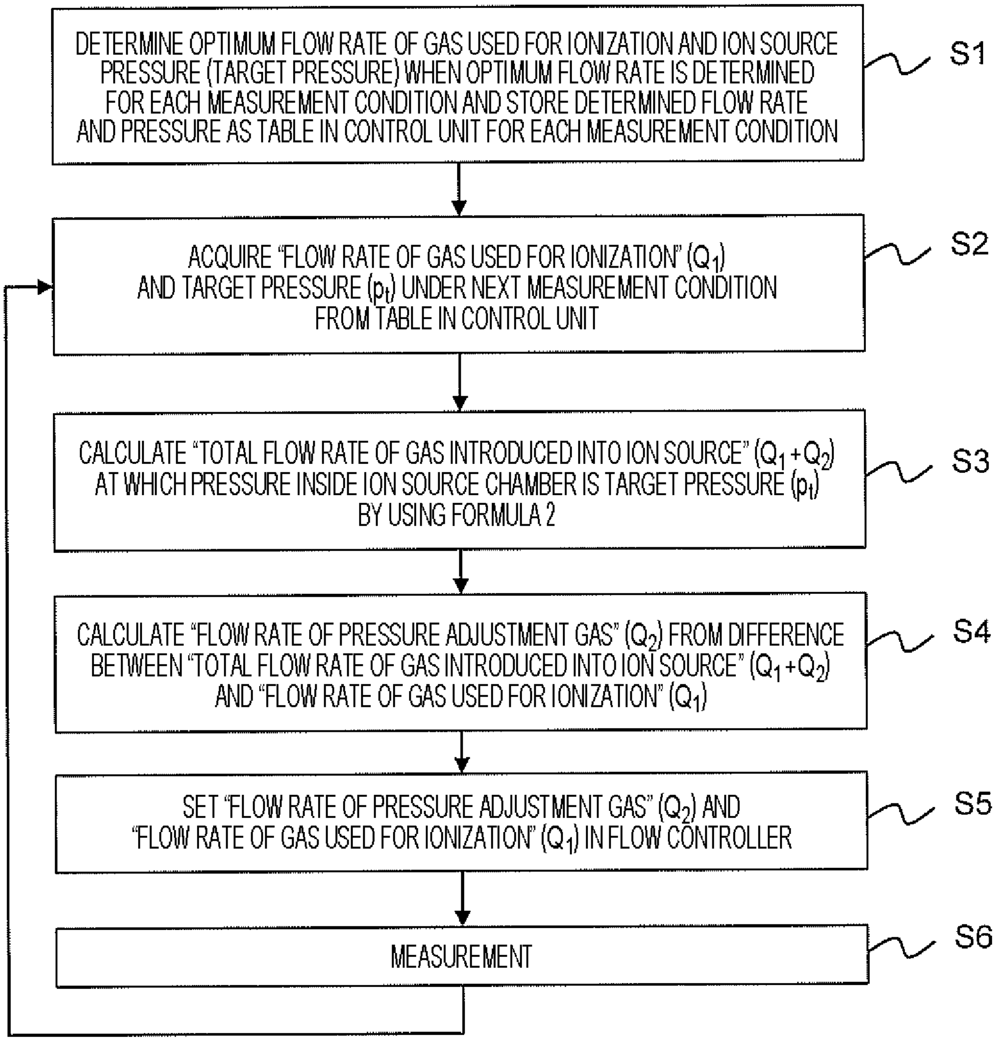
FIG. 3 illustrates a control flow according to First Embodiment.

FIG. 3 illustrates a flow of a control operation of First Embodiment. This control operation is executed by the control unit 10, for example. In this example, Formula 2 is used. First, preliminary evaluation is performed before starting measurement, and a table in which an optimum value of the "flow rate of the gas used for ionization" ($Q_1$) is associated with a pressure (target pressure) ($p_t$) inside the ion source chamber 4 corresponding to the optimum value is created for one or more measurement conditions (preferably a plurality of measurement conditions) (step S1).

A specific form of this table can be freely designed. A single table may be used, or a table (first table) indicating a relationship between the measurement condition and $Q_1$ and a table (second table) indicating a relationship between the measurement condition and $p_t$ may be individually defined. It can also be said that these tables are tables indicating a relationship between $Q_1$ and $p_t$.

Here, since a relationship between the target pressure and the optimum flow rate of the gas used for ionization under each measurement condition is constant, it is sufficient to perform the preliminary evaluation once for each measurement condition, and thereafter, the preliminary evaluation can be omitted for the same measurement condition.

When a sample is measured, first, on the basis of the table stored in the control unit 10, the "optimum flow rate of the gas used for ionization" ($Q_1$) under measurement conditions for measurement to be performed next and the pressure inside the ion source chamber 4, that is, the target pressure ($p_t$) are acquired (step S2).

Next, the control unit 10 substitutes the target pressure ($p_t$) acquired in step S2 into $p_1$ in Formula 2, and further substitutes the back pressure ($p_0$) measured by the pressure gauge 15 and the conductance ($C_1$) of the flow path resistor 14 (which may be stored in the control unit 10, for example) into Formula 2 to calculate the "total flow rate of the gases introduced into the ion source" ($Q_1+Q_2$) (step S3). That is, the control unit 10 calculates a sum of the "flow rate of the gas used for ionization" ($Q_1$) and the "flow rate of the pressure adjustment gas" ($Q_2$) on the basis of the target pressure ($p_t$).

Subsequently, the "flow rate of the pressure adjustment gas" ($Q_2$) is calculated as a difference between the "total flow rate of the gases introduced into the ion source" ($Q_1+Q_2$) calculated in step S3 and the "flow rate of the gas used for ionization" ($Q_1$) acquired in step S1 (step S4). That is, the control unit 10 calculates the "flow rate of the pressure adjustment gas" ($Q_2$) by subtracting the "flow rate of gas used for ionization ($Q_1$)" from the "total flow rate of the gases introduced into the ion source" ($Q_1+Q_2$).

Thereafter, the control unit 10 gives an instruction for the "flow rate of the pressure adjustment gas" ($Q_2$) and the "flow rate of the gas used for ionization" ($Q_1$) to the flow controller 11 (step S5). Thereafter, the mass spectrometer 1 performs measurement on the sample (step S6). After step S6, the process returns to step S2, and the above-described control is repeated.

Figure 4:
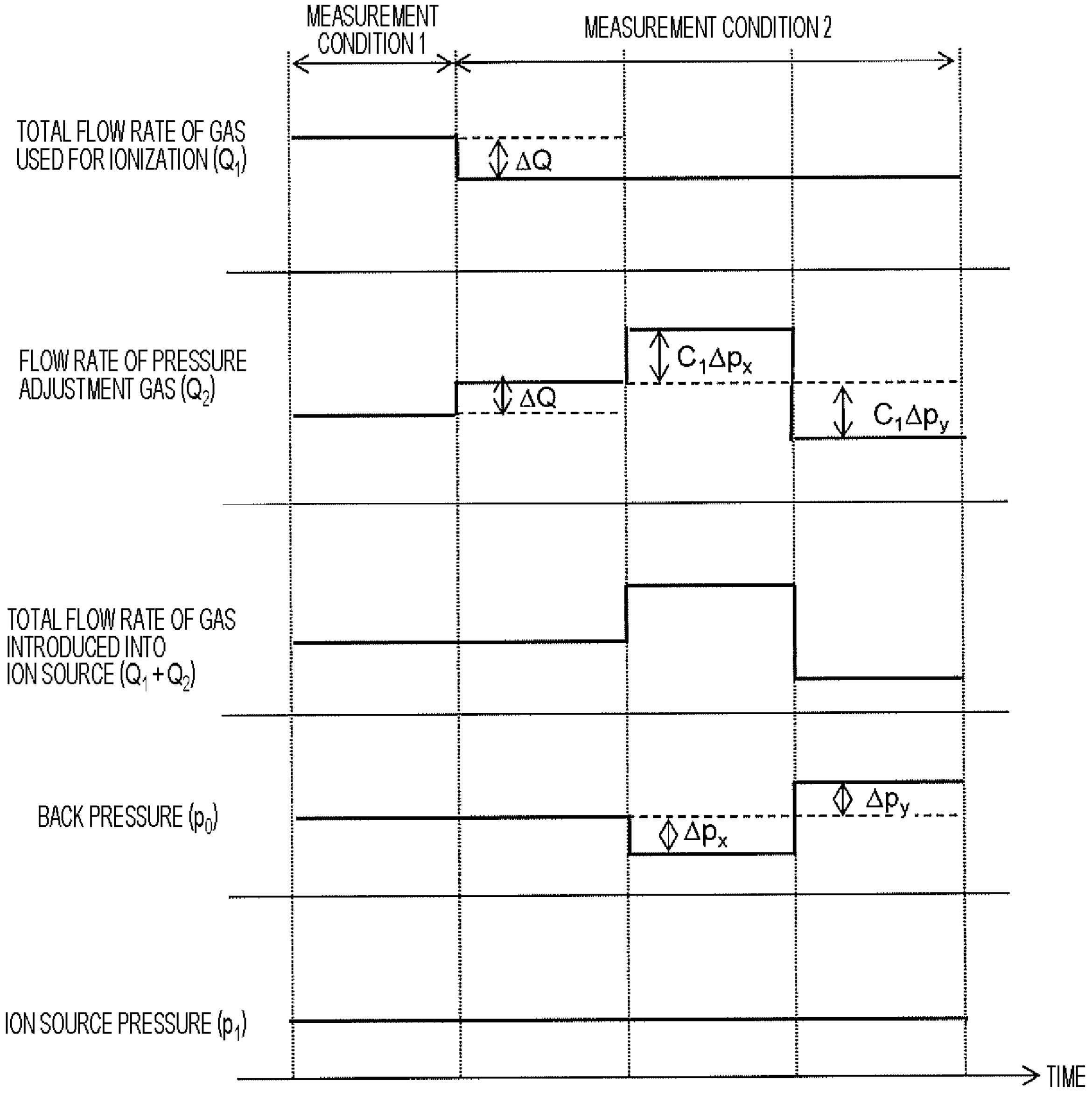
FIG. 4 is an explanatory diagram of a principle of First Embodiment.

FIG. 4 schematically illustrates a relationship between a gas flow rate and a pressure in a case where the control is performed in the control flow of FIG. 3. In a case where the back pressure ($p_0$) is constant and the measurement condition is switched from measurement condition 1 to measurement condition 2, the "flow rate of the pressure adjustment gas" ($Q_2$) is controlled such that the sum of the "flow rate of the gas used for ionization" ($Q_1$) and the "flow rate of the pressure adjustment gas" ($Q_2$) is constant. In the example in FIG. 4, $Q_2$ increases by $\Delta Q$, and thus the pressure ($p_1$) inside the ion source chamber 4 is maintained constant.

On the other hand, in a case where the back pressure ($p_0$) varies, the "flow rate of the pressure adjustment gas" ($Q_2$) is controlled to cancel the pressure variation inside the ion source chamber 4 due to the change in the back pressure ($p_0$) as well as the change in the "flow rate of the gas used for ionization" ($Q_1$).

As a specific example, as illustrated in FIG. 4, in a case where $p_0$ decreases by $\Delta p_x$, $Q_2$ is set to be higher by $C_1\Delta p_x$, and in a case where the back pressure increases by $\Delta p_y$, $Q_2$ is set to be lower by $C_1\Delta p_y$, so that the pressure inside the ion source chamber 4 can be maintained at the constant target pressure ($p_t$).

As described above, the control unit 10 maintains the pressure inside the ion source chamber 4 constant or suppresses the variation in the pressure by controlling the "flow rate of the pressure adjustment gas" ($Q_2$).

As described above, according to present embodiment, the pressure inside the ion source chamber 4 can be made constant by setting the "flow rate of the gas used for ionization" ($Q_1$) to the optimum value and then adjusting the "flow rate of the pressure adjustment gas" ($Q_2$) that does not directly influence the sensitivity. As a result, it is possible to always perform highly sensitive and robust measurement without depending on the atmospheric pressure around the mass spectrometer 1 or the exhaust performance of a facility in which the mass spectrometer 1 is installed.

In the present embodiment, since the control unit 10 controls the "flow rate of the pressure adjustment gas" ($Q_2$) on the basis of a measurement value of the pressure gauge 15, the accuracy is improved compared with the control on the basis of the pressures in the vacuum chambers 101, 102, and 103.

Second Embodiment

In Second Embodiment, a shape of the pressure adjustment gas introduction port 5 is changed in First Embodiment. Hereinafter, description of parts common to First Embodiment may be omitted.

Figure 5:
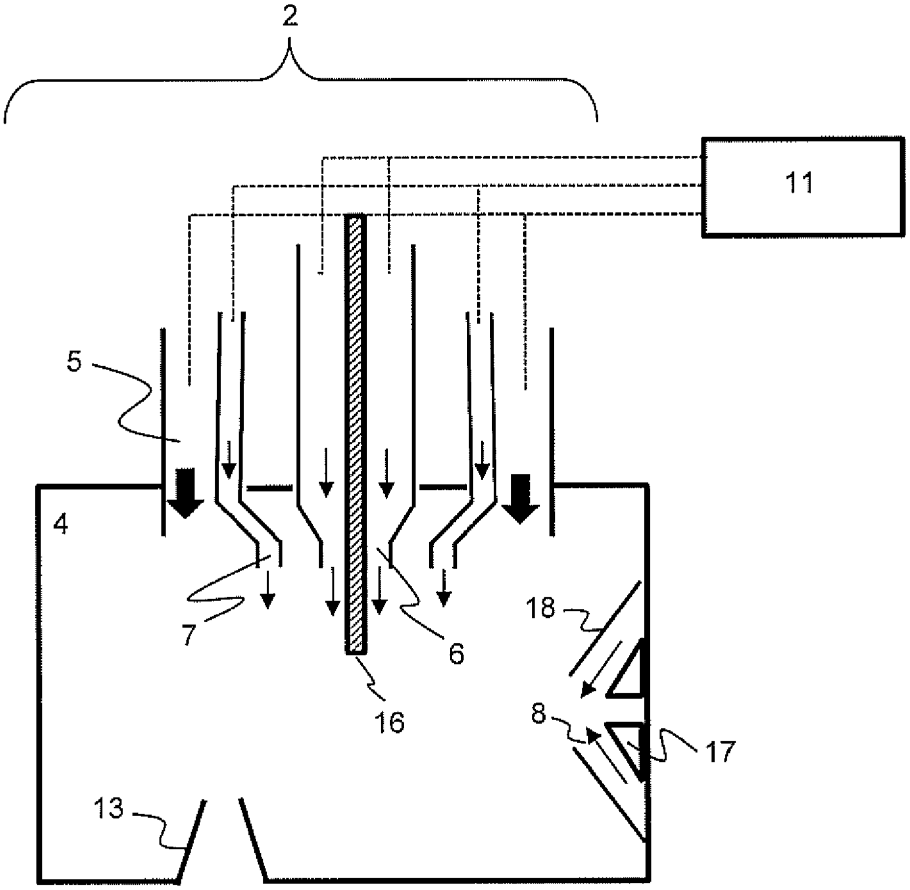
FIG. 5 is a configuration diagram of an ion source of Second Embodiment.

FIG. 5 illustrates a shape of the pressure adjustment gas introduction port 5 of Second Embodiment. A substantially cylindrical nebulizer gas spray pipe is provided around the capillary 16, and a substantially cylindrical heating gas spray pipe is further provided outside the nebulizer gas spray pipe. In Second Embodiment, a substantially cylindrical pressure adjustment gas flow path outer tube is disposed outside the heating gas spray pipe. A flow path of the pressure adjustment gas is formed between the heating gas spray pipe and the pressure adjustment gas flow path outer tube.

As described above, in Second Embodiment, the pressure adjustment gas introduction port 5 is provided on the outer periphery of at least a part (in Second Embodiment, a portion which is the nebulizer gas introduction port 6 and the heating gas introduction port 7 and does not include the counter gas introduction port 8) of the second gas introduction port to surround the at least the part.

In the configuration of Second Embodiment, since the pressure adjustment gas does not disturb a flow of the gas used for ionization, high sensitivity can be obtained compared with the configuration of First Embodiment. On the other hand, in the configuration of First Embodiment, the structure is simpler than that of Second Embodiment, and the manufacturing cost is reduced.

Third Embodiment

In First Embodiment and Second Embodiment, the back pressure ($p_0$) is directly measured. Third Embodiment modifies First Embodiment or Second Embodiment so that the back pressure is not directly measured, but the back pressure is calculated on the basis of a pressure measured by a vacuum gauge in the vacuum chamber. Hereinafter, description of parts common to First Embodiment or Second Embodiment may be omitted.

The number of vacuum chambers (number of stages) included in the mass spectrometer 1 is set to N (where $N \geq 1$). In the example in FIG. 1, N=3. Each vacuum chamber is represented by a number n (where $1 \leq n \leq N$). The vacuum chambers 101, 102, and 103 are respectively first (n=1), second (n=2), and third (n=3) vacuum chambers. The mass spectrometer 1 includes a vacuum gauge (that is, the vacuum gauges 40 and 41 in FIG. 1) for measuring the pressure in each vacuum chamber for the vacuum chambers (that is, the vacuum chambers 101 and 102) other than the last stage.

A flow rate $q'_n$ of a gas flowing into the n-th vacuum chamber is given by Formula 3 in FIG. 8. Here, $S_n$ represents an exhaust speed of the n-th vacuum pump, $p'_n$ represents a pressure in the n-th vacuum chamber, and $q'_{n+1}$ represents the flow rate of the gas flowing into the (n+1)-th vacuum chamber (that is, a flow rate of a gas flowing from the n-th vacuum chamber to the (n+1)-th vacuum chamber).

In a case where the flow rate $q'_{n+1}$ of the gas flowing into the next-stage vacuum chamber is sufficiently smaller than a flow rate $S_n p'_n$ of the gas exhausted by a vacuum pump, Formula 3 in FIG. 8 can be approximated as in Formula 4. In the vacuum chamber at the last stage (the vacuum chamber 103 corresponding to n=3 in the example in FIG. 1), since the flow rate flowing out to the vacuum chamber at the next stage is 0, $q'_{n+1}=0$ in Formula 3, and Formula 4 is established.

When a conductance between the nth vacuum chamber and the (n+1)-th vacuum chamber is $C'_{n+1}$, the relationship of Formula 5 in FIG. 8 is established. Note that $c'_1$ is a conductance between the ion source chamber 4 and the first vacuum chamber 101. In Formula 5, $p'_0$ when n=0 represents the pressure in the ion source chamber 4. This $p'_0$ corresponds to $p_1$ in First Embodiment and Second Embodiment.

In the vacuum chamber at the last stage (the vacuum chamber 103 corresponding to n=3 in the example in FIG. 1), there is no subsequent stage, and the conductance $C'_{n+1}$ to the vacuum chamber at the subsequent stage and the pressure $p'_{n+1}$ in the vacuum chamber at the subsequent stage are 0, so that the right side of Formula 5 is 0.

In Formula 3 to 5, the exhaust speed Sn of each vacuum pump and the conductance $C'_n$ between the vacuum chambers are constants determined depending on a specific configuration of the mass spectrometer 1, and may be determined before the start of an analysis operation. The pressure $p'_n$ of each vacuum chamber is a value measured by the vacuum gauge of each vacuum chamber.

As described above, the pressure in the ion source chamber 4 can be calculated on the basis of Formula 3 to 5. For example, in a case where Formula 3 is approximated by Formula 4 in each vacuum chamber, when n=1 in Formula 4, $q'_1=S_1p'_1$ is obtained, and $S_1$ and $p'_1$ are substituted into this formula to calculate $q'_1$. Next, when n=0 in Formula 5, $q'_1=c'_1(p'_0-p'_1)$, and $q'_1$, $c'_1$, and $p'_1$ can be substituted into this formula to be solved for $p'_0$, that is, the pressure in the ion source chamber 4.

In a case where Formula 3 is not approximated by Formula 4 in each vacuum chamber, first, considering the vacuum chamber 103 at the last stage in Formula 3 (that is, n=N), since the flow rate flowing out to the vacuum chamber at the next stage is 0 as described above, $q'_{n+1}=0$, and $q'_N=S_N P'_N$ is established. $S_N$ and $p'_N$ are substituted into this formula to calculate $q'_N$. By substituting the calculated $q'_N$ into Formula 3, $q'_{N-1}$, $q'_{N-2}$, . . . , and $q'_1$ can be sequentially calculated. Finally, if n=0 in Formula 5, $q'_1=c'_1(p'_0-p'_1)$, and $q'_1$, $c'_1$, and $p'_1$ can be substituted into this formula to be solved for $p'_0$, that is, the pressure in the ion source chamber 4.

Although the pressure $p'_N$ of the vacuum chamber 103 at the last stage is used in the above description, a method of acquiring or calculating this value may be appropriately designed. For example, a vacuum gauge for measuring the pressure of the vacuum chamber 103 may be provided.

Figure 6:
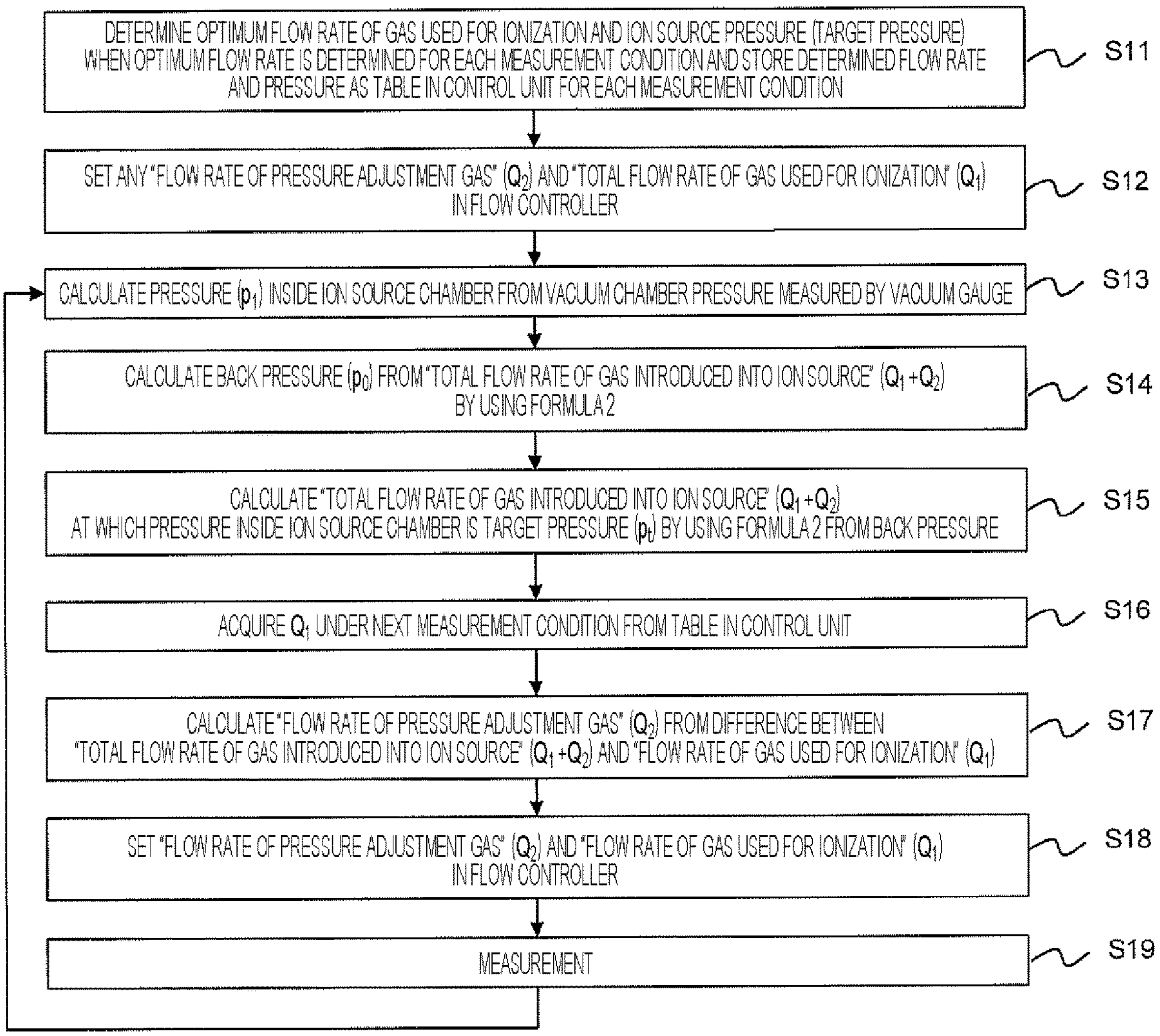
FIG. 6 illustrates a control flow of Third Embodiment.

FIG. 6 illustrates a control flow of Third Embodiment. This control operation is executed by the control unit 10, for example. First, as in step S1 in FIG. 3, preliminary evaluation is performed before starting measurement, and a table in which the "optimum flow rate of the gas used for ionization" ($Q_1$) is associated with the pressure ($p_t$) inside the ion source chamber 4 corresponding to the optimum flow rate is created for one or more measurement conditions (step S11).

Next, any value is set as the "total flow rate of the gases introduced into the ion source" ($Q_1+Q_2$) in the flow controller 11 (step S12). This value is an initial value, and for example, $Q_1$ and $Q_2$ determined according to measurement conditions may be determined in advance, and values thereof may be used.

Next, on the basis of the pressure measured by the vacuum gauge of each vacuum chamber, the pressure $p_1$ inside the ion source chamber 4 is calculated by using Formulas 3 to 5 in FIG. 8 (step S13).

Then, the back pressure $p_0$ is calculated from the "total flow rate of the gases introduced into the ion source" ($Q_1+Q_2$) by using Formula 2 (step S14).

Next, from the back pressure $p_0$ calculated in step S14, the "total flow rate of the gases introduced into the ion source" ($Q_1+Q_2$) at which the pressure inside the ion source is the target pressure ($p_t$) is calculated by using Formula 2 (step S15).

Next, the "optimum flow rate of the gas used for ionization" ($Q_1$) under the measurement conditions for measurement to be performed next is acquired on the basis of the table stored in the control unit 10 (step S16).

Subsequent processes (steps S17 to S19) may be similar to steps S4 to 6 in First Embodiment (FIG. 3). After step S19, the process returns to step S13, and the above-described control is repeatedly performed.

As described above, in Third Embodiment, the control unit 10 controls the "flow rate of the pressure adjustment gas" ($Q_2$) on the basis of the measurement values of the vacuum gauges 40 and 41. Thus, in Third Embodiment, the pressure gauge 15 is unnecessary compared with First Embodiment, and thus there is an advantage that the cost is low. The vacuum gauge installed in the vacuum chamber is more robust than the pressure gauge installed in the flow path through which an exhaust gas of a sample flows, and has an advantage that the vacuum gauge may be used without maintenance for a longer period of time.

Fourth Embodiment

In the Fourth Embodiment, a threshold value determination process related to a pressure difference is added in First Embodiment. Hereinafter, description of parts common to First Embodiment may be omitted.

Figure 7:
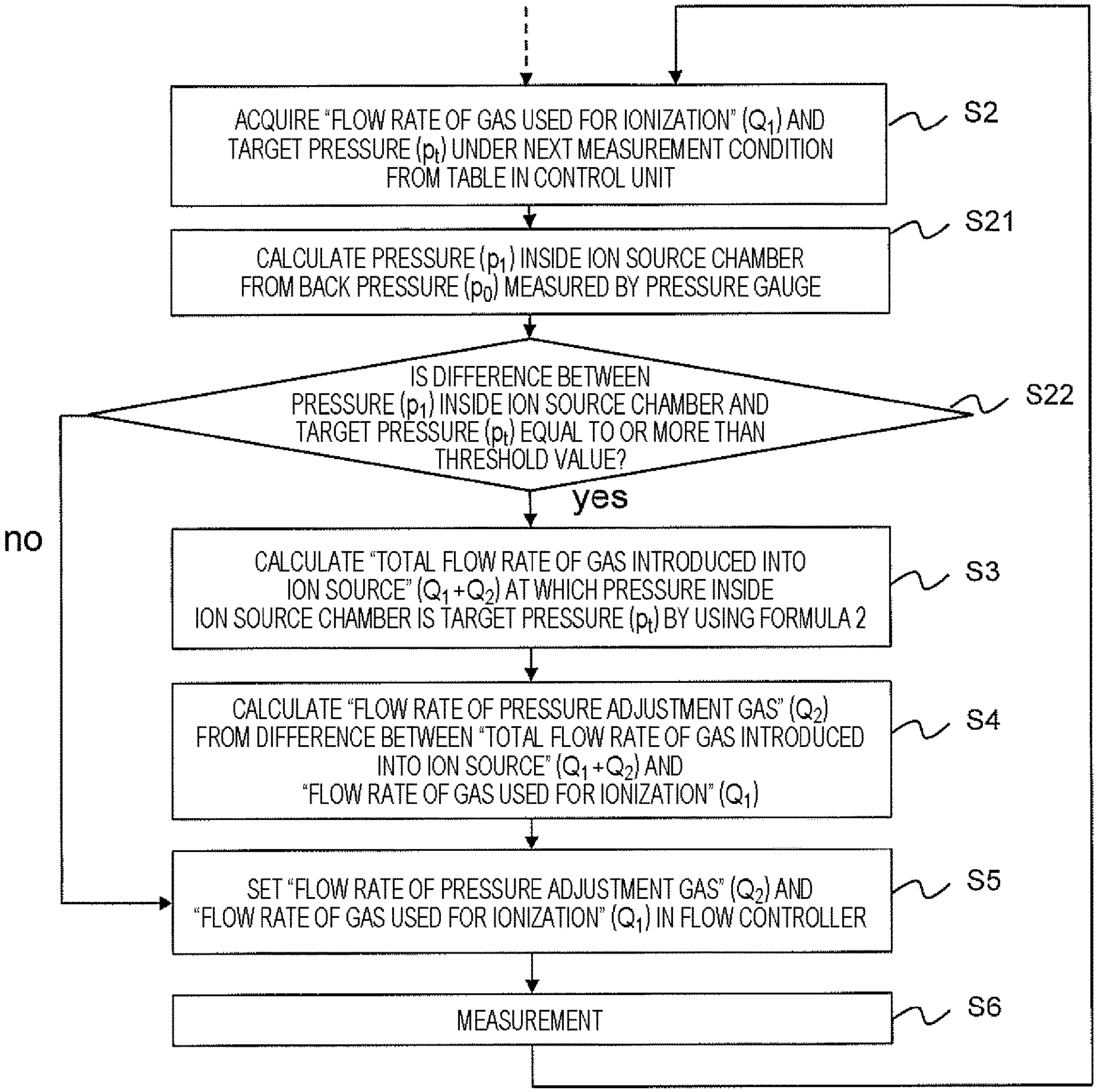
FIG. 7 illustrates a control flow of Fourth Embodiment.

FIG. 7 illustrates a control flow of the Fourth Embodiment. In Fourth Embodiment, after step S2, the pressure ($p_1$) inside the ion source chamber 4 is calculated by using Formula 2 on the basis of the back pressure ($p_0$) measured by the pressure gauge (step S21). Next, it is determined whether or not a difference between the pressure ($p_1$) inside the ion source chamber 4 and the target pressure ($p_t$) exceeds a predetermined threshold value (first threshold value) (step S22).

In a case where the difference exceeds the first threshold value, the "flow rate of the pressure adjustment gas" ($Q_2$) is changed according to the same control flow as in First Embodiment (steps S3 to S6). In a case where the difference does not exceed the threshold value, the "flow rate of the pressure adjustment gas" ($Q_2$) is not changed.

In general, ionization is unstable in a period until the flow rate of the pressure adjustment gas is stabilized after the "flow rate of the pressure adjustment gas" ($Q_2$) introduced into the ion source chamber 4 is changed, and thus, there is a possibility that measurement data in the period cannot be used. Therefore, from the viewpoint of ionization stability, the frequency of changing the "flow rate of the pressure adjustment gas" ($Q_2$) is preferably low.

In Fourth Embodiment, in a case where the difference between the pressure inside the ion source 2 and the target pressure is equal to or less than the threshold value, the "flow rate of the pressure adjustment gas" ($Q_2$) is not changed, and thus the frequency of changing the "flow rate of the pressure adjustment gas" ($Q_2$) is lower than that in First Embodiment. Therefore, it is possible to perform measurement with a higher throughput than in First Embodiment.

REFERENCE SIGNS LIST

1 mass spectrometer
2 ion source
3 vacuum chamber
4 ion source chamber
5 pressure adjustment gas introduction port (first gas introduction port)
6 nebulizer gas introduction port (second gas introduction port)
7 heating gas introduction port (second gas introduction port)
8 counter gas introduction port (second gas introduction port)
9 power supply
10 control unit
11 flow controller
12 exhaust mechanism
13 exhaust port (gas discharge port)
14 flow path resistor
15 pressure gauge
16 capillary (inlet)
17 introduction electrode
18 counter electrode
40, 41 vacuum gauge
80 ion transport unit
81 mass spectrometry unit
82 detector
90 pore (outlet)
91, 92 pore
101 to 103 vacuum chamber
104 to 106 vacuum pump All publications, patents, and patent applications cited herein are hereby incorporated by reference in their entirety.

The invention claimed is:

1. A mass spectrometer comprising:
an ion source that ionizes a sample;
a mass spectrometry unit that detects ions for each mass-to-charge ratio;
a control unit that controls a flow rate of a gas; and
a storage unit,
wherein
the ion source includes
an ion source chamber,
an inlet through which the sample is introduced into the ion source chamber,
a first gas introduction port through which a first gas is introduced into the ion source chamber,
a second gas introduction port through which a second gas for ionizing the sample is introduced into the ion source chamber, an outlet through which ions are discharged from the ion source chamber to the mass spectrometry unit, and a gas discharge port through which a gas is discharged from the ion source chamber, the storage unit stores a table indicating a relationship between a measurement condition and a flow rate of the second gas, and the control unit changes the flow rate of the second gas according to the measurement condition on the basis of the table, and controls a flow rate of the first gas to suppress a variation in a pressure inside the ion source chamber.

2. The mass spectrometer according to claim 1, wherein the gas discharge port includes a flow path resistor, and there is a pressure difference between downstream of the flow path resistor and the inside of the ion source chamber.

3. The mass spectrometer according to claim 1, wherein the gas discharge port includes a flow path resistor, the mass spectrometer further comprises a pressure gauge disposed downstream of the flow path resistor, and the control unit controls the flow rate of the first gas on the basis of a measurement value of the pressure gauge.

4. The mass spectrometer according to claim 1, further comprising:

one or more vacuum chambers; and a vacuum gauge for measuring a pressure in each of the vacuum chambers, wherein the control unit controls the flow rate of the first gas on the basis of a measurement value of each of the vacuum gauges.

5. The mass spectrometer according to claim 1, wherein the first gas introduction port is provided on an outer periphery of at least a part of the second gas introduction port to surround the at least the part.

6. The mass spectrometer according to claim 3, wherein the control unit calculates the pressure inside the ion source chamber on the basis of the measurement value of the pressure gauge, and does not change the flow rate of the first gas in a case where a difference between the pressure inside the ion source chamber and a predetermined target pressure does not exceed a first threshold value.

7. The mass spectrometer according to claim 1, wherein the storage unit stores a table indicating a relationship between the measurement condition and a target pressure inside the ion source chamber, and the control unit calculates a sum of the flow rate of the first gas and the flow rate of the second gas on the basis of the target pressure, and calculates the flow rate of the first gas by subtracting the flow rate of the second gas from the sum.

8. A method for controlling a mass spectrometer, the method comprising:

changing a flow rate of a second gas for ionizing a sample according to a measurement condition on the basis of a table indicating a relationship between the measurement condition and the flow rate of the second gas; and controlling a flow rate of a first gas to suppress a variation in a pressure inside an ion source chamber.

* * * * *